United States Patent Office 2,961,487
Patented Nov. 22, 1960

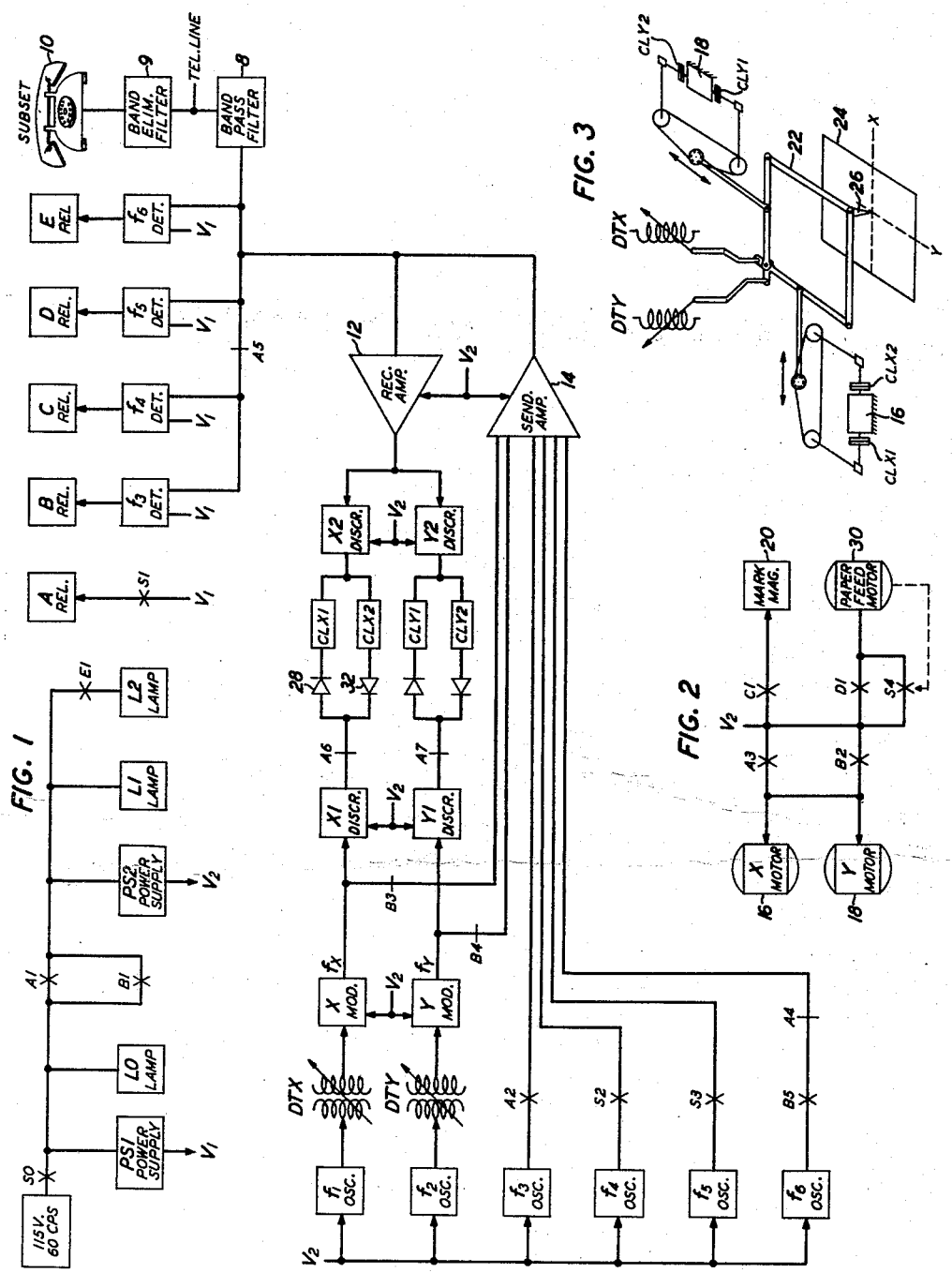

2,961,487
TELAUTOGRAPH FOLLOW-UP SYSTEM

Stanley J. Elliott, Summit, N.J., and Arthur C. Keller, Bronxville, N.Y., assignors to Bell Telephone Laboratories, Incorporated, New York, N.Y., a corporation of New York Filed Dec. 1, 1958, Ser. No. 777,352
1 Claim. (Cl. 178—18)

This invention relates to systems for the transmission of intelligence and particularly to a follow-up system wherein a follow-up member at a receiving station moves under the influence of motions produced at a transmitting station.

Follow-up systems wherein mechanical motions at a transmitting station cause the transmission of signals to a receiving station to produce mechanical motions corresponding to those at the transmitting station are well known. In systems of this type the motions at each station embody the intelligence to be transmitted and received.

The means embodying the invention to be described finds particular application in telautograph systems wherein handwriting at the transmitting station is resolved into two components in accordance with a coordinate system by a linkage mechanism which connects a writing stylus to each of a pair of signal generators. A signal corresponding to each component is generated and both signals are transmitted to a receiving station where each signal causes a component motion to be generated which corresponds to the respective component at the transmitter. These component motions are translated into the single motion of a receiving stylus by a linkage mechanism which connects the stylus to the receiving motion generators.

It is an object of this invention to provide a follow-up system in which the transmission of a large range of signals is obtained economically and with improved reliability and operation.

To accomplish this objective the invention features the use of frequency modulated signals for the transmission of the two components or coordinates, and for system control purposes. The signals are generated by means of local oscillators which are used to excite displacement transducers, which, as in a preferred embodiment of the invention, may be differential transformers. The transducer outputs (one for each coordinate) are constant frequency amplitude modulated voltages or currents proportional to stylus displacement. These signals are then converted by well-known means to alternating voltage signals whose frequencies are functions of the stylus displacement. At the receiving station the signals are fed to discriminators which provide direct-current signals the magnitudes of which are functions of the input frequencies. The received signals are matched against differential transformer signals provided at the receiving station to develop error or control signals. These error signals operate clutches such as magnetic clutches, which couple the writing stylus linkage to continuously operating motors for clockwise or counterclockwise engagement to reduce the error signals to zero. At the zero point the displacement of the writing stylus driven through the clutches at the receiving station will match the displacement of the writing stylus at the transmitting station.

The nature of the invention and its distinguishing features and advantages will be more clearly understood from the following detailed description and the accompanying drawings in which:

Figs. 1 and 2, taken together, are a diagrammatic representation of one embodiment of the invention as applied to a telautograph system, and Fig. 3 is a diagram illustrating one form of linkage mechanism which may be included in the embodiment of the invention.

All the components shown in Figs. 1, 2 and 3 are required at each station (local and distant) for the transmission and reception of signals.

Referring now to the drawings, the telautograph at each station is shown connected to the regular telephone line through filter 8, and to the local commercial power supply. Filters 8 and 9 are provided to assure adequate separation between the telautograph and speech signals at the telautograph and telephone instruments. The closing of master switch S0 turns on power supply PS1 and places the telautograph in standby condition, ready to receive signals from a distant station or to be used for transmission of signals to a distant station. Power supply PS1 supplies appropriate voltage V1 to the F3, F4, F5 and F6 detectors. Switch S0 also energizes lamp LO to indicate that the set is in the standby condition.

When the local subscriber wants to transmit writing signals to a distant station, he obtains the connection to the distant station in the customary manner, using his telephone subset 10. He then closes the switch S1. Switch S1, on closing, operates the A relay and relay contacts A1 through A7. Contact A1 closes, turning on power supply PS2 and lighting the L1 lamp to indicate that power supply PS2 is energized. Power supply PS2 supplies appropriate voltage V2 to the fixed frequency oscillators F1 through F6, the X and Y modulators, the X1, X2, Y1 and Y2 discriminators, the receiving amplifier 12 and the sending amplifier 14. Contact A2 closes, transmitting a voltage of frequency F3 to the distant station. This signal will prepare the distant station (as described hereinafter) for receiving and recording writing signals transmitted by the local station. Contact A3 closes, thereby energizing X motor 16 and Y motor 18. Contact A4 opens, preventing transmission of signals from the F6 oscillator to the distant station. The F6 signal is transmitted only when the station is in the condition to receive and record signals. Contact A5 opens, thereby disabling the F3 and F4 detectors. This is a lockout feature which prevents the local set from being switched into the receiving condition by F3 signals and prevents the mark magnet 20 from being actuated by F4 signals. (When the set is in the receiving condition operation of the mark magnet presses the writing stylus down against the paper.) Contacts A6 and A7 open to prevent operation of clutches CLX1, CLX2, CLY1 and CLY2 which, otherwise, could couple the writing linkage 22 to the driving motors 16 and 18. Operation of any clutch while the subscriber is writing would impose undesirable mechanical loads on the writing stylus.

At the distant station, signal F3 is received by the F3 detector. This operates the B relay and its contacts B1 through B5. Contact B1 closes, turning on power supply PS2 and lighting the L1 lamp. Power supply PS2 supplies voltage V2 to the distant station circuits in the manner described above for the local station. Contact B2 closes, energizing the X and Y motors. Contacts B3 and B4 open, thereby preventing the transmission of FX and FY (the X and Y coordinate signals) back to the local station. Contact B5 closes, transmitting a voltage of frequency F6 back to the local station.

At the local station, the F6 signal from the distant station is received by the F6 detector. As a result, the E relay and its contact E1 operate to energize the L2 lamp, indicating that the distant station is ready to receive.

The local subscriber then proceeds to write on the paper 24 (or other writing surface) with stylus 26. Switch S2 is disposed in such manner that it will close when the stylus is pressed down against the paper or other writing surface. The closure of switch S2 permits a voltage of frequency F4 to be transmitted to the distant station. At the distant station, the F4 signal is received by the F4 detector. Relay C and its contact C1 then operate to energize the mark magnet 20 which presses the stylus down upon the paper. When the stylus at the local station is lifted from the paper, switch S2 opens and, as a result, the stylus at the distant station is also lifted away from the paper.

The X and Y coordinate signals are generated and utilized as follows: The voltage of frequency F1 from the F1 oscillator is applied to the primary winding of differential transformer DTX. As shown in Fig. 3, the core of this transformer is coupled to the writing linkage so that its displacement is a function of the X displacement of the writing stylus. Since the coupling between the primary and secondary windings depends upon the core position, the output voltage from the differential transformer is also a function of the X displacement of the writing stylus. This amplitude-modulated signal is fed into the X modulator, which, by conventional methods, converts the signal to an alternating voltage whose frequency FX is a function of the X displacement of the writing stylus. This FX signal, the X coordinate signal, is transmitted to the distant station, where it is amplified and fed into the X2 discriminator. The output from the X2 discriminator is a direct-current voltage EX whose magnitude is a function of the input frequency FX. In the ideal case, the voltage EX would be directly proportional to the X displacement. Direct proportionality is not essential, however; it is only necessary that the EX vs. X characteristic be the same for both the local and distant stations and that its slope is neither zero nor infinite at any point in the working range.

In a similar way at the distant station, there is generated an alternating voltage whose frequency FX' is a function of the X displacement of the writing stylus at the distant station. This FX' signal is converted by the X1 discriminator to produce a direct-current voltage EX' whose magnitude then is a function of the X displacement of the writing stylus at the distant station. Clutch CLX1, in series with diode 28, is connected between the outputs of the X1 and X2 discriminators. Because of the rectifying characteristic of the diode, current can flow through CLX1 when voltage EX' is more positive than EX. When current flows through clutch CLX1, the clutch operates and couples the X motor 16 to the writing linkage. This drives the linkage (and the core of differential transformer DTX) in the direction to make EX' less positive. When EX' becomes equal to EX, the current through clutch CLX1 drops to zero, the clutch releases, and motion of the writing linkage stops. At this point the X displacement of the writing stylus at the distant station matches the X displacement of the writing stylus at the local station.

When voltage EX' is less positive than EX, current flows through clutch CLX2 and diode 32 and drives the writing linkage in the direction to make EX' more positive. Clutch CLX2 releases when the X displacement at the distant station matches the X displacement at the local station. Thus, regardless of the previous X displacement of the linkage at the distant station, it always is driven into a position matching the X displacement at the local station.

The sequence of operations for the Y coordinate is similar to that for the X coordinate, but starting with the F2 oscillators and utilizing the DTY differential transformers, the Y modulators, the Y1 and Y2 discriminators, the CLY1 and CLY2 clutches, and the Y motor 18.

When the subscriber at the local station has finished writing, he may open the off-normal switch S1 and restore the local station and distant station to the stand-by condition. If, at this point, the distant subscriber wants to write additional information on the same paper that was used originally, he closes his switch S1. This activates the distant station for transmission and activates the local station for reception. From that point on the operation of the two stations is the same as that described previously except that the functions of the two stations are interchanged.

Whenever power supply PS2 is on, the paper feed mechanism can be actuated by closing switch S3. This transmits a voltage of frequency F5 from the F5 oscillator to the distant station and to F5 detector in the local station. This operates the D relay, closing the D1 contact and energizing the paper feed motor 30. An off-normal switch S4, in parallel with contact D1, closes as soon as the paper feed mechanism moves. This keeps the paper feed motor energized until the paper has been transported through one complete frame, at which time S4 opens. Switch S3 is closed only momentarily to start the paper feed motor so that the motor will stop after one frame of the paper has been transported. However, switch S3 may be held closed beyond one frame, so that the paper will continue to be fed. The paper feed mechanism at both stations can be activated by closing the S3 switch at either station if both PS2 power supplies are turned on. If only one of the PS2 power supplies is turned on, however, that station can activate its own paper feed mechanism but cannot activate the feed mechanism at the other station.

It is to be understood that the above-described arrangements are illustrative of the application of the principles of the invention. Other arrangements may be devised by those skilled in the art without departing from the spirit and scope of the invention.

What is claimed is:

In a follow-up system for moving a following element at a receiving station to positions corresponding to those of a directing element at a transmitter station, a first generator associated with said directing element for producing a first constant frequency alternating voltage signal whose amplitude is a function of the position of said directing element, means coupled to said generator for converting said signal to an alternating voltage signal whose frequency is a function of the displacement of said directing element, said first generator comprising a source of constant frequency alternating voltage and a transformer including a primary winding coupled to said source of voltage, a movable core coupled to said directing element, and a secondary winding coupled to said converting means, a second generator associated with said following element for producing a second constant frequency alternating voltage signal whose amplitude is a function of the position of said following element, means coupled to said second generator for converting said signal to an alternating voltage signal whose frequency is a function of the displacement of said following element, said second generator comprising a second source of constant frequency alternating voltage and a second transformer including a primary winding coupled to said second source of voltage, a movable core coupled to said following element, and a secondary winding coupled to said converting means, means for transmitting said first signal to said receiving station, a pair of discriminators at said receiving station for individually detecting said first and second signals, the output of one of said discriminators being a unidirectional voltage whose magnitude is a function of the displacement of the directing element, the output of the other of said discriminators being a unidirectional voltage whose magnitude is a function of the displacement of the following element, driving means for controlling the position of said following element, said driving means comprising a continually operating motor and first and second clutch means coupled to said motor and to said following element, a pair of oppositely poled diodes, said diodes and clutch means being serially connected to the outputs of said discriminators in such manner that said first clutch means is energized to drive said following element in one direction when the output of one discriminator is greater than the output of the other discriminator, and said second clutch means is energized to drive said following element in the other direction when the output of said other discriminator is greater than the output of said one discriminator.

References Cited in the file of this patent

UNITED STATES PATENTS

| | | |
|---|---|---|
| 2,557,329 | Wild | June 19, 1951 |
| 2,584,267 | Hayek | Feb. 5, 1952 |
| 2,623,943 | Adler | Dec. 30, 1952 |